Feb. 23, 1965  J. R. WRIGHT  3,170,736
MOUNTINGS FOR JOURNAL BEARINGS
Filed Sept. 24, 1962
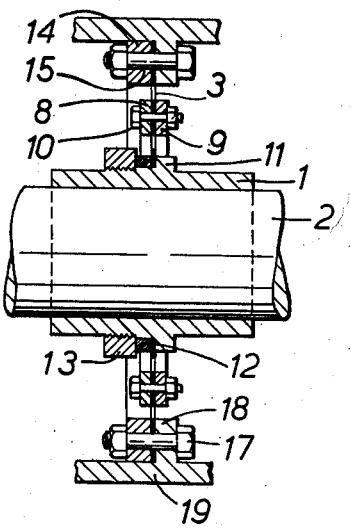
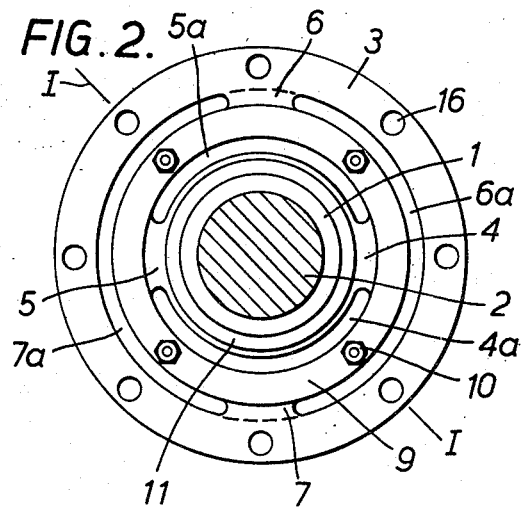

United States Patent Office 3,170,736
Patented Feb. 23, 1965

3,170,736
MOUNTINGS FOR JOURNAL BEARINGS
James Rostron Wright, Culcheth, near Warrington, England, assignor to United Kingdom Atomic Energy Authority, London, England
Filed Sept. 24, 1962, Ser. No. 225,654
Claims priority, application Great Britain, Oct. 3, 1961, 35,609/61
2 Claims. (Cl. 308—26)

This invention relates to mountings for journal bearings and it provides in one form a mounting for a journal bearing designed for operation with gas lubrication between the journal bearing and a journal disposed therein.

A mounting for a journal bearing designed for operation with gas lubrication between the journal bearing and a journal disposed therein should have a degree of flexibility for angular deflections in order to allow the journal bearing to follow small angular deflections of the journal about its axis. It should also have rigidity in other directions in order to provide a good load carrying capacity. The mounting should also resist concave distortion due to the weight of the journal bearing when the bearing is vertically orientated, since such distortion would oppose the flexibility for angular deflection.

According to the invention a mounting for a journal bearing comprises a disc slotted at a first radius to define a first pair of diametrically opposed flexible webs, slotted at a second radius to define a second pair of diametrically opposed flexible webs displaced angularly by 90° relative to the first pair of flexible webs, and means stiffening the disc between the first and second pairs of flexible webs.

By way of example a mounting in accordance with the invention will now be described with reference to the accompanying drawings in which:

FIGURE 1 is a side view in section, and
FIGURE 2 is an end view in the direction of arrow II of FIGURE 1, I—I indicating the line of section of FIGURE 1.

The drawings show a mounting for a journal bearing 1 designed for operation with gas lubrication between the journal bearing and a journal in the form of a rotatable shaft 2 disposed therein, the mounting comprising an annular disc 3 slotted at a first radius to define a first pair of diametrically opposed flexible webs 4, 5 between arcuate slots 4a, 5a, and slotted at a second radius to define a second pair of diametrically opposed flexible webs 6, 7 between arcuate slots 6a, 7a, the pair of webs 6, 7 being displaced angularly by 90° relative to the first pair of webs 4, 5. Between the first and second pairs of flexible webs 4, 5 and 6, 7, means stiffening the disc 3 is shown in the form of corresponding stiffening rings 8, 9 secured in corersponding positions to opposite sides of the disc 3 by bolts 10.

The bearing 1 has an external peripheral flange 11 to which the inner periphery of the disc 3 is clamped by a clamping ring 12 held in position by a locking ring 13 in screw-threaded engagement with the bearing 1. The outer periphery of the disc 3 is provided with a sealed or integral clamping ring 14 having bolt holes 15. The disc 3 has corersponding bolt holes 16 thereby enabling the disc 3 to be clamped at its outer periphery by bolts 17 to a circular flange 18 on a casing 19 in which the bearing 1 is positioned (the parts 17, 18, 19 are shown only in FIGURE 1 for clarity).

The first and second pairs of flexible webs 4, 5 and 6, 7 ensure that the mounting has flexibility for angular deflections in order to allow the bearing 1 to follow small angular deflections of the shaft 2 about it axis. The rings 8, 9 ensure that the mounting has rigidity in other directions in order to provide a good load carrying capacity. The mounting is particularly advantageously employed to resist concave distortions due to the weight of the bearing when the bearing is vertically orientated.

The invention is not limited to the details of the foregoing example. Thus the rings 8, 9 may be formed integral with the disc 3 by machining the mounting from a metal blank.

The size and surface finish of the bearing surfaces of the bearing 1 and shaft 2 is such as to sustain gas lubrication when the shaft is rotating operationally. Typically for a thickness of the disc 3 in the range 0.005″ to 0.010″ and an outer diameter of 3.25″ for the disc 3, the shaft 2 has a diameter of one inch and the mean radial clearance between the bearing surfaces of the bearing 1 and shaft 2 is in the range 0.0005″ to 0.0007″ depending on the gas lubricant. The bearing 1 then has an outer diameter of 1.25″, the flange 11 an outer diameter of 1.5″, the slots 4a, 5a (and hence the webs 4, 5) a radial width of 0.125″ at an inner radius of 1.5625″ and the slots 6a, 7a (and hence the webs 6, 7) a radial width of 0.125″ at an inner radius of 2,3125″. The rings 8, 9 have a combined thickness of 0.1875″. In general, to meet the requirements of flexibility for angular deflections and rigidity in other directions, the arcuate length of the webs 4, 5, 6, 7 should not exceed about six times their radial width.

I claim:
1. A mounting for a journal bearing, comprising a disc slotted at a first radius to define a first pair of diametrically opposed flexible webs, slotted at a second radius to define a second pair of diametrically opposed flexible webs displaced angularly by 90° relative to the first pair of flexible webs, and corersponding stiffening rings provided in corresponding positions on opposite sides of the disc between the first and second pairs of flexible webs.

2. A mounting as claimed in claim 1, wherein the flexible webs have an arcuate length of up to about six times their radial width.

References Cited in the file of this patent
UNITED STATES PATENTS
2,874,008    Orte et al. _____ Feb. 17, 1959